Nov. 20, 1923. 1,474,540
M. T. McNULTY
COMBINED GASKET AND VAPORIZER FOR AUTOMOBILES AND MOTORS
Filed Nov. 8, 1922

Inventor
Martin T. McNulty
By Watson E. Coleman
Attorney

Patented Nov. 20, 1923.

1,474,540

UNITED STATES PATENT OFFICE.

MARTIN T. McNULTY, OF UNDERWOOD, MINNESOTA.

COMBINED GASKET AND VAPORIZER FOR AUTOMOBILES AND MOTORS.

Application filed November 8, 1922. Serial No. 599,703.

*To all whom it may concern:*

Be it known that I, MARTIN T. McNULTY, a citizen of the United States, residing at Underwood, in the county of Otter Tail and State of Minnesota, have invented certain new and useful Improvements in Combined Gaskets and Vaporizers for Automobiles and Motors, of which the following is a specification, reference being had to the accompanying drawings.

This invention relates to improvements in combined gaskets and vaporizers for the intake manifolds of internal combustion engines.

An important object of the invention is to provide in combination a gasket member for insertion between the manifold and carbureter of an internal combustion engine, and a strainer member carried by the gasket member for breaking up the particles of liquid carried in the air passing through the manifold from the carbureter.

A further object of the invention is to provide a device of this character which is adjustable, permitting the insertion of auxiliary screens when the use thereof is found desirable.

A still further object of the invention is to provide a device of this character which is simple in its construction and arrangement, durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:—

Figure 1:
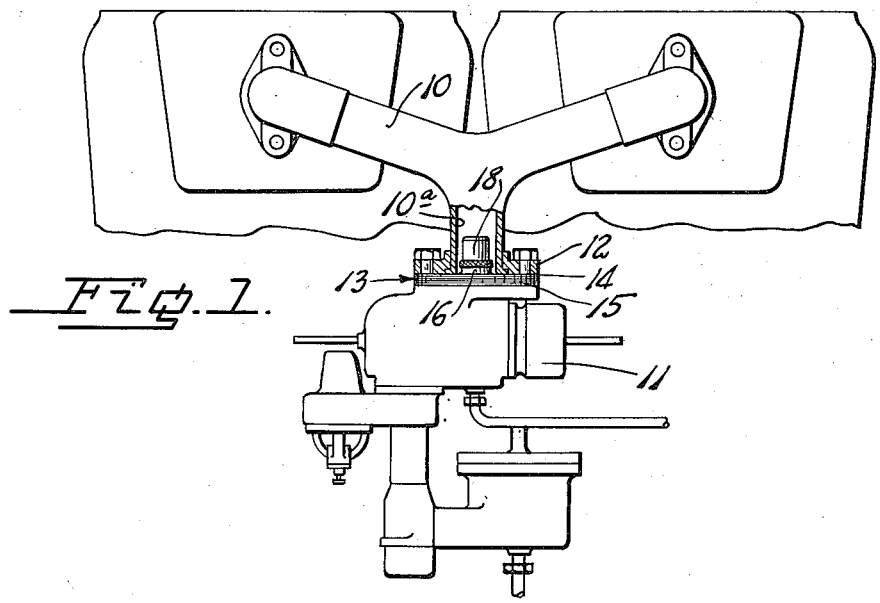
Figure 1 is a side elevation partially in section, showing a combined gasket and vaporizer constructed in accordance with my invention applied to an engine.
Figure 2:
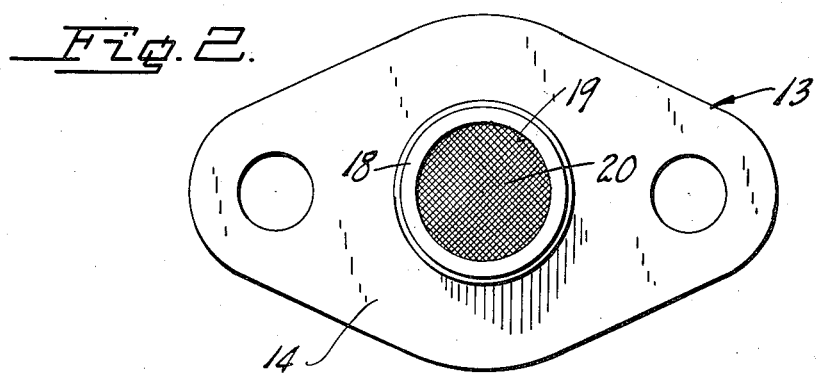
Figure 2 is a plan view of the device detached.
Figure 3:
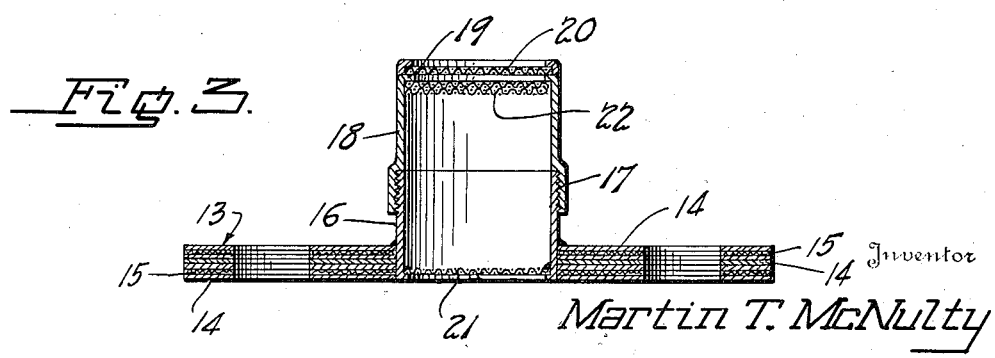
Figure 3 is a sectional view therethrough.

Referring now more particularly to the drawings, the numeral 10 indicates the intake manifold of an engine, 11 the carbureter and 12 the flanges formed upon the manifold 11 and carbureter 12 by means of which they are secured together with the interposition of a gasket 13. In accordance with my invention the gasket 13, which is composed of a plurality of layers of metal 14 and layers of asbestos or other packing material 15 disposed intermediate certain of the layers of metal, has formed therein an opening of slightly less diameter than the bore 10$^a$ of the manifold with which the device is adapted to coact. The opening of the gasket 13 has extended therein one end of a tube 16 which is joined to each of the metallic layers 14 in any suitable manner, preferably by welding or soldering at the points of contact.

The opposite end of the tube 16 is externally screw-threaded, as indicated at 17, for coaction with the interiorly screw-threaded end of a tube 18. The opposite end of the tube 18 is preferably provided with a slightly inwardly turned shoulder 19 to which is secured a screen 20 closing the shouldered end of the tube 18. The end of the tube 16 which is engaged with the gasket has secured thereto a second screen 21 closing what is the inlet end of this tube. If desired or found necessary in practice, auxiliary screens 22 may be inserted in the tube 18 where they will be held against the screen 20 by the suction created in the intake manifold and supplement the action thereof.

In the use of my device, the face of the gasket beyond which the tube 16 projects is applied to the flange 12 of the intake manifold so that the tube 16 projects into the intake manifold, as does likewise the tube 18 carried by the tube 16. The carbureter is then placed in position and the bolts extended through the openings in the flanges 12 and gasket 13 in the usual manner. Fuelized air passing from the carbureter 11 to the manifold 10 must pass through the tubes 16 and 18 and accordingly through the screens 20, 21 and the auxiliary screens 22 if these are provided. During this passage the particles of fuel not completely atomized in the carbureter will be broken up and accordingly a more perfect fuel delivered to the manifold 10 from the carbureter. Attention is directed to the fact that by the construction employed the use of auxiliary gaskets for preventing liquid at the junction of the carbureter and manifold is prevented, and at the same time an efficient and durable structure is provided. It will be obvious that this structure is capable of some change and modification, and I accordingly do not limit myself to the structure hereinbefore set forth except as hereinafter claimed.

I claim:—

In a combined gasket and vaporizer for automobiles and motors, a gasket adapted for insertion between opposed flanges of an intake manifold and carbureter having an opening of slightly less diameter than the bore of the manifold with which it is adapted to coact, a tube extending into the intake manifold and having its inner end disposed within the bore of the gasket, a second tube having threaded engagement with that end of the first named tube disposed within the intake manifold, screens carried by remote ends of the first and second named tubes, and auxiliary screens loosely disposed within said tubes and during operation of the engine normally held against the screen of the last named tube by the suction created within the manifold.

In testimony whereof I hereunto affix my signature.

MARTIN T. McNULTY.